United States Patent
Akihisa et al.

(10) Patent No.: US 8,302,569 B2
(45) Date of Patent: Nov. 6, 2012

(54) SPARK-IGNITED INTERNAL COMBUSTION ENGINE AND METHOD OF CONTROLLING THE SAME

(75) Inventors: Daisuke Akihisa, Susono (JP); Eiichi Kamiyama, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 431 days.

(21) Appl. No.: 12/663,292

(22) PCT Filed: Jul. 11, 2008

(86) PCT No.: PCT/IB2008/001809
§ 371 (c)(1),
(2), (4) Date: Dec. 7, 2009

(87) PCT Pub. No.: WO2009/007834
PCT Pub. Date: Jan. 15, 2009

(65) Prior Publication Data
US 2010/0180869 A1    Jul. 22, 2010

(30) Foreign Application Priority Data

Jul. 12, 2007 (JP) .................................. 2007-183536

(51) Int. Cl.
*F02B 75/04* (2006.01)
(52) U.S. Cl. .................................. 123/48 C; 123/90.15
(58) Field of Classification Search ................ 123/48 C, 123/78 C, 90.15, 90.16, 90.17, 90.18
See application file for complete search history.

(56) References Cited

U.S. PATENT DOCUMENTS

| 6,932,054 B2* | 8/2005 | Kikori ............................ 123/347 |
| 7,917,279 B2* | 3/2011 | Akihisa et al. ................. 701/103 |
| 8,011,332 B2* | 9/2011 | Sawada et al. .............. 123/48 C |
| 8,109,243 B2* | 2/2012 | Akihisa et al. .............. 123/48 C |
| 2004/0083992 A1 | 5/2004 | Nohara et al. |
| 2005/0087155 A1* | 4/2005 | Kikori .......................... 123/78 C |
| 2007/0095313 A1 | 5/2007 | Kamiyama et al. |
| 2010/0139622 A1* | 6/2010 | Akihisa et al. .............. 123/48 C |

FOREIGN PATENT DOCUMENTS

| DE | 101 16 264 | 10/2002 |
| EP | 1 418 322 | 5/2004 |
| JP | 2002 285877 | 10/2002 |
| JP | 2003 13764 | 1/2003 |
| JP | 2004 218522 | 8/2004 |
| JP | 2004 218551 | 8/2004 |
| JP | 2005 220754 | 8/2005 |

* cited by examiner

*Primary Examiner* — Noah Kamen
*Assistant Examiner* — Hung Q Nguyen
(74) *Attorney, Agent, or Firm* — Oblon, Spivak, McClelland, Maier & Neustadt, L.L.P.

(57) ABSTRACT

A spark-ignited internal combustion engine includes a variable compression ratio mechanism (A) that changes a mechanical compression ratio and an actual compression ratio start timing-changing mechanism (B) that changes a start timing at which actual compression starts. The maximum mechanical compression ratio while the engine is in operation is reduced with increase in engine speed.

12 Claims, 14 Drawing Sheets

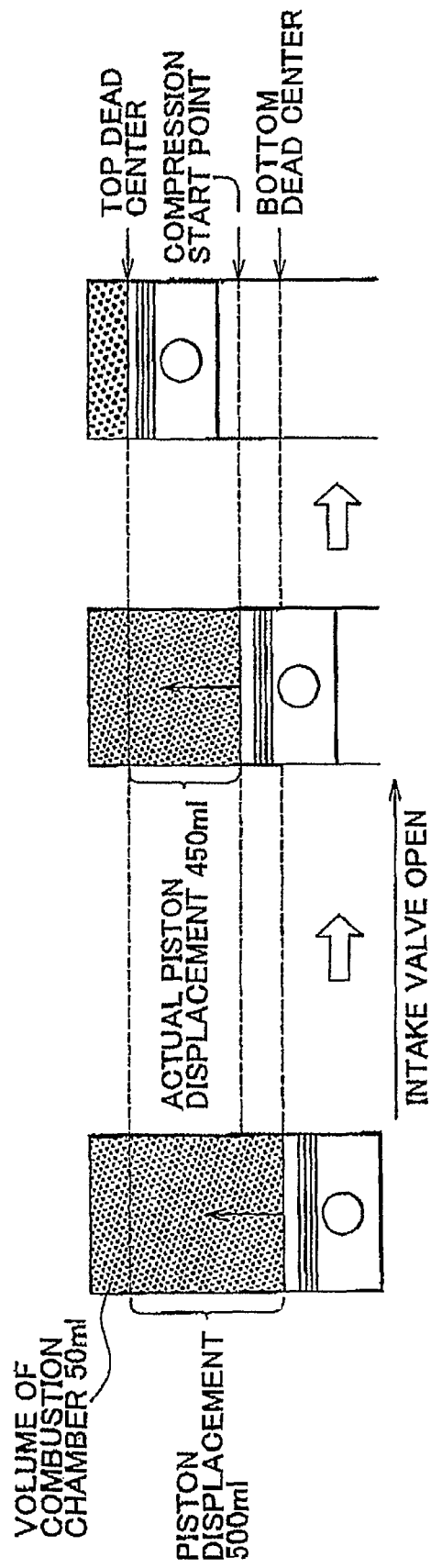

SPARK-IGNITED INTERNAL COMBUSTION ENGINE AND METHOD OF CONTROLLING THE SAME

BACKGROUND OF THE INVENTION

1. Field of the Invention

The invention relates to a spark-ignited internal combustion engine and a method of controlling the spark-ignited internal combustion engine.

2. Description of the Related Art

An available spark-ignited internal combustion engine includes a variable compression ratio mechanism that changes a mechanical compression ratio, and a variable valve timing mechanism that controls a valve closing timing at which an intake valve is closed, wherein during middle or high engine load operation, as a load applied to the engine decreases, the mechanical compression ratio is increased and the valve closing timing of the intake valve is retarded (see Japanese Patent Application Publication No. 2004-218522, for example).

When the mechanical compression ratio is increased, the volume of the combustion chamber decreases, and therefore, the space between the top surface of a piston and the inner surface of the cylinder head, the intake valve, and the exhaust valve when the piston reaches the top dead center is reduced. When this occurs, such a space is minimized when the mechanical compression ratio is brought to the maximum mechanical compression ratio. Meanwhile, the inertial force of the piston increases as the engine speed increases, and therefore, as the engine speed increases, the space between the top surface of the piston and the inner surface of the cylinder head, etc. is reduced because of elongation of a connecting rod that connects the piston and a crankshaft, for example.

Thus, when the engine speed increases while the mechanical compression ratio is high, there is a fear that the top surface of the piston interferes with the inner surface of the cylinder head, etc., and the probability of occurrence thereof becomes highest when the mechanical compression ratio is brought to the maximum mechanical compression ratio. However, in the above-described internal combustion engine, no consideration is given to such a fear.

SUMMARY OF THE INVENTION

According to an aspect of the invention, a spark-ignited internal combustion engine includes a variable compression ratio mechanism that changes a mechanical compression ratio, which is obtained by dividing a sum of the volume of a combustion chamber and a piston displacement by the volume of the combustion chamber, and an actual compression ratio start timing-changing mechanism that changes a start timing at which actual compression starts. The maximum mechanical compression ratio while the engine is in operation is reduced with increase in engine speed.

According to another aspect of the invention, in a method of controlling a spark-ignited internal combustion engine, which includes a variable compression ratio mechanism that changes a mechanical compression ratio, which is obtained by dividing a sum of the volume of a combustion chamber and a piston displacement by the volume of the combustion chamber, and an actual compression ratio start timing-changing mechanism that changes a start timing at which actual compression starts, the maximum mechanical compression ratio while the engine is in operation is reduced with increase in engine speed.

By reducing the maximum mechanical compression ratio with the increase in the engine speed, it is possible to prevent the top surface of the piston and the inner surface of the cylinder head, etc. from interfering with each other.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIGS. 6A to 6C are diagrams for describing a mechanical compression ratio, an actual compression ratio, and an expansion ratio;

DETAILED DESCRIPTION OF EMBODIMENTS

Figure 1:
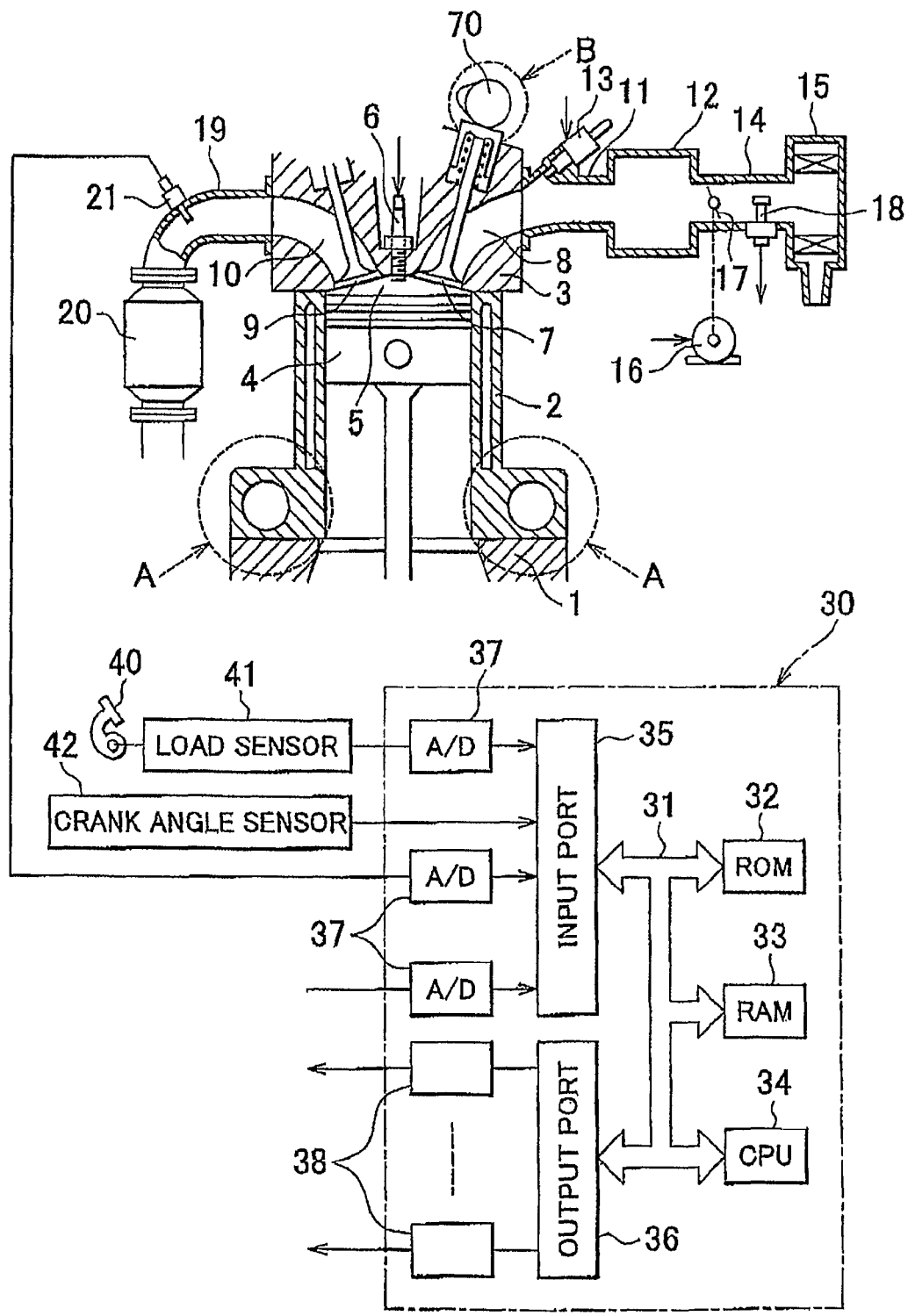
FIG. 1 is an overall view of a spark-ignited internal combustion engine.

FIG. 1 shows a sectional side view of a spark-ignited internal combustion engine. Referring to FIG. 1, reference numeral 1 indicates a crankcase; 2, a cylinder block; 3, a cylinder head; 4, a piston; 5, a combustion chamber; 6, a spark plug disposed in a center portion of a top face of the combustion chamber 5; 7, an intake valve; 8, an intake port; 9, an exhaust valve; and 10, an exhaust port, respectively. The intake port 8 is connected to a surge tank 12 via an intake pipe 11. For each intake pipe 11, a fuel injection valve 13 for injecting fuel into the corresponding intake port 8 is disposed. Note that the fuel injection valve 13 may be disposed in each combustion chamber 5 instead of installing in each intake pipe 11.

The surge tank 12 is connected to an air cleaner 15 via an intake duct 14. Disposed in the intake duct 14 are a throttle valve 17 driven by an actuator 16, and an intake air amount detector 18 using a hot wire, for example. Meanwhile, the exhaust port 10 is connected to a catalytic converter 20 incorporating a three-way catalyst, for example, via an exhaust manifold 19, and an air-fuel ratio sensor 21 is disposed in the exhaust manifold 19.

In the embodiment shown in FIG. 1, a variable compression ratio mechanism A is provided at the joint portion between the crankcase 1 and the cylinder block 2. The variable compression ratio mechanism A changes the volume of the combustion chamber 5 that occurs when the piston 4 is positioned at the compression top dead center, by changing the relative position between the crankcase 1 and the cylinder block 2 in the cylinder axis direction, and in addition, an actual compression start timing-changing mechanism B that changes the timing at which actual compression starts is provided. In the embodiment shown in FIG. 1, the actual compression start timing-changing mechanism B is a variable valve timing mechanism that controls the valve closing timing, at which the intake valve 7 is closed.

An electronic control unit 30 is a digital computer and includes a read only memory (ROM) 32, a random access memory (RAM) 33, a microprocessor (CPU) 34, an input port 35, and an output port 36, which are connected to one another via a bidirectional bus 31. The output signal from the intake air amount detector 18 and the output signal from the air-fuel ratio sensor 21 are inputted to the input port 35 via respective analogue/digital (A/D) converters 37. A load sensor 41 that generates an output voltage proportional to the amount of depression L of an accelerator pedal 40 is connected to the accelerator pedal 40, and the output voltage from the load sensor 41 is inputted to the input port 35 via a corresponding one of the A/D converters 37. In addition, a crank angle sensor 42 that generates an output pulse every time a crankshaft turns 30 degrees, for example, is connected to the input port 35. Meanwhile, the output port 36 is connected to the spark plug 6, the fuel injection valve 13, the throttle valve driving actuator 16, the variable compression ratio mechanism A and the variable valve timing mechanism B, via respective drive circuits 38.

Figure 2:
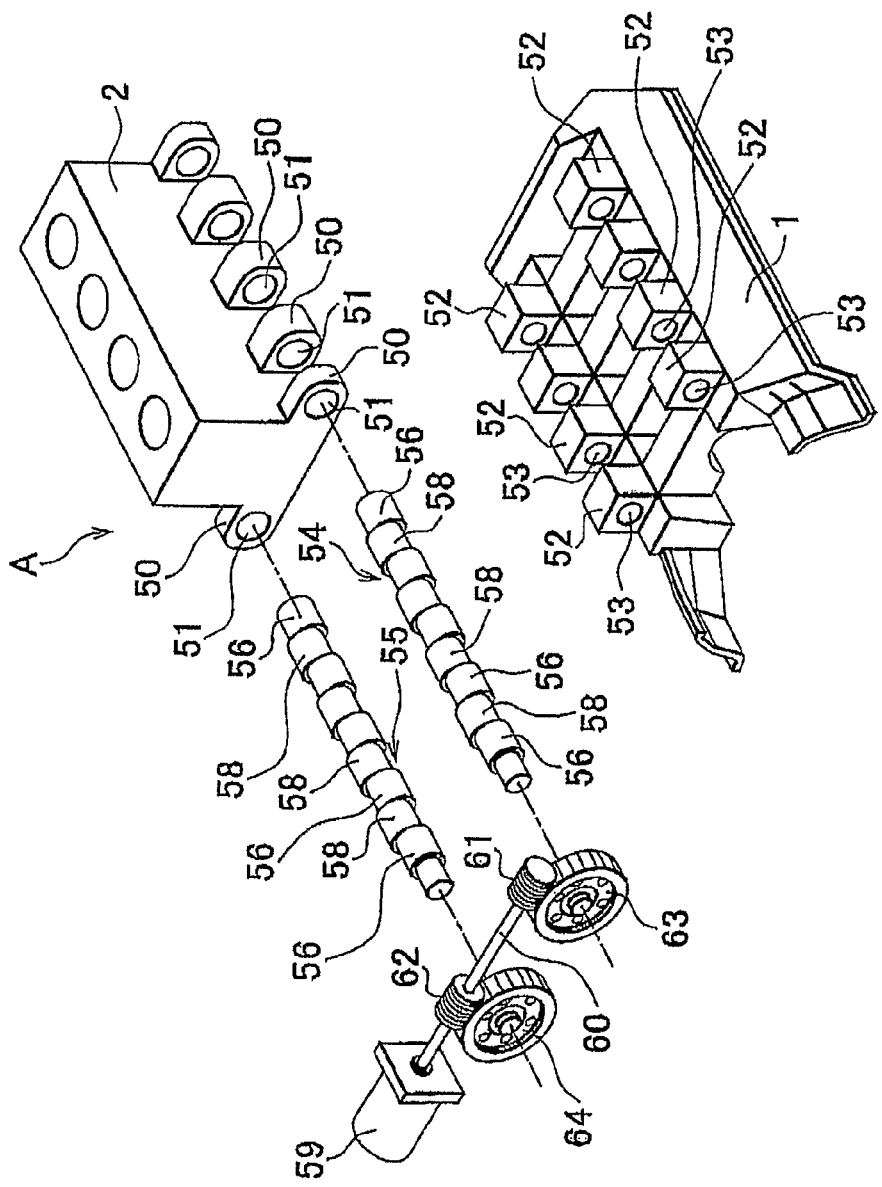
FIG. 2 is an exploded perspective view of a variable compression ratio mechanism.
Figure 3A:
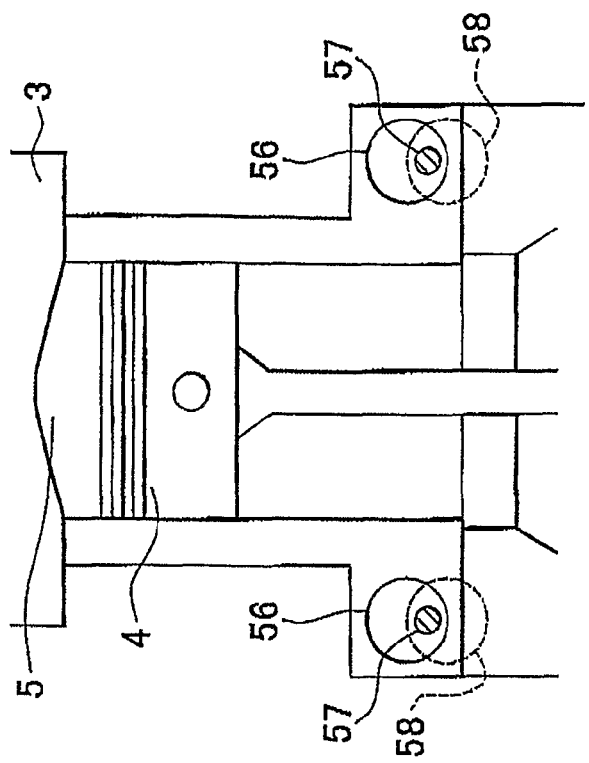
FIGS. 3A and 3B are schematic, sectional side views of an internal combustion engine.
Figure 3B:
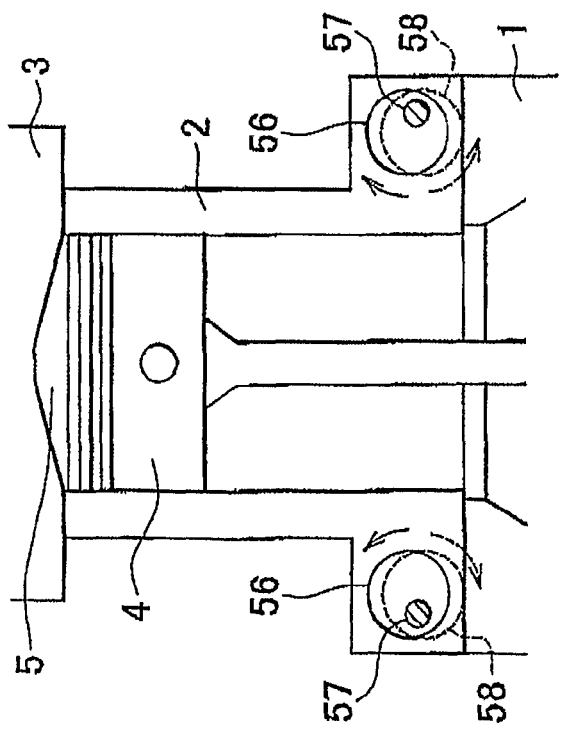

FIG. 2 shows an exploded perspective view of the variable compression ratio mechanism A shown in FIG. 1. FIGS. 3A and 3B show schematic, sectional side views of an internal combustion engine. Referring to FIG. 2, a plurality of protrusions 50 spaced apart from each other are formed at a lower area of each side wall of the cylinder block 2, and a cam insertion hole 51 having a circular cross section is formed in each protrusion 50. Meanwhile, a plurality of protrusions 52 spaced apart from each other and fitted into the spaces between the corresponding protrusions 50 are formed on the upper surface of the crankcase 1, and a cam insertion hole 53 having a circular cross section is formed in each protrusion 52.

As shown in FIG. 2, a pair of camshafts 54 and 55 are provided, and circular cams 56 that are rotatably fitted into respective cam insertion holes 51 are fixed to the camshafts 54 and 55. These circular cams 56 are coaxial with the rotation axes of the camshafts 54 and 55. Meanwhile, an eccentric shaft 57 that is eccentrically positioned with respect to the rotational axis of each of the camshafts 54 and 55 is extended between each pair of the circular cams 56 as shown by hatching in FIGS. 3A and 3B, and another circular cam 58 is eccentrically and rotatably fitted onto the eccentric shaft 57. As shown in FIG. 2, these circular cams 58 are disposed between the circular cams 56, and each circular cam 58 is rotatably inserted into the corresponding cam insertion hole 53.

If the circular cams 56 that are fixed to the camshafts 54 and 55 are rotated in the opposite directions as shown by the solid arrows in FIG. 3A when the mechanism is in a state as shown in FIG. 3A, the eccentric shafts 57 move to a bottom center position. Thus, the circular cams 58 rotate in the cam insertion holes 53 in the direction opposite to the direction in which the circular cams 56 rotate, as shown by the broken arrows in FIG. 3A, and when the eccentric shafts 57 come to the bottom center position as shown in FIG. 3B, the center of the circular cams 58 comes to a position under the eccentric shafts 57.

As can be understood by comparing FIGS. 3A and 3B, the relative position between the crankcase 1 and the cylinder block 2 is determined by the distance between the center of the circular cams 56 and the center of the circular cams 58. The cylinder block 2 moves away from the crankcase 1 as the distance between the center of the circular cams 56 and the center of the circular cams 58 increases. As the cylinder block 2 moves away from the crankcase 1, the volume of the combustion chamber 5 that occurs when the piston 4 is at the compression top dead center increases, and thus it is possible to change the volume of the combustion chamber 5 that occurs when the piston 4 is at the compression top dead center, by rotating the camshafts 54 and 55.

As shown in FIG. 2, a pair of worm gears 61 and 62 having spiral teeth directed oppositely to each other are fixed to a rotary shaft of a driving motor 59 for rotating the camshafts 54 and 55 in opposite directions as shown in FIG. 2. Gears 63 and 64 that engage with the worm gears 61 and 62 are fixed to ends of the camshafts 54 and 55. In this embodiment, by driving the driving motor 59, it is possible to change, over a wide range, the volume of the combustion chamber 5 that occurs when the piston 4 is at the compression top dead center. Note that the variable compression ratio mechanism A shown in FIGS. 1, 2, 3A and 3B is an example, and it is possible to use any type of variable compression ratio mechanism.

Figure 4:
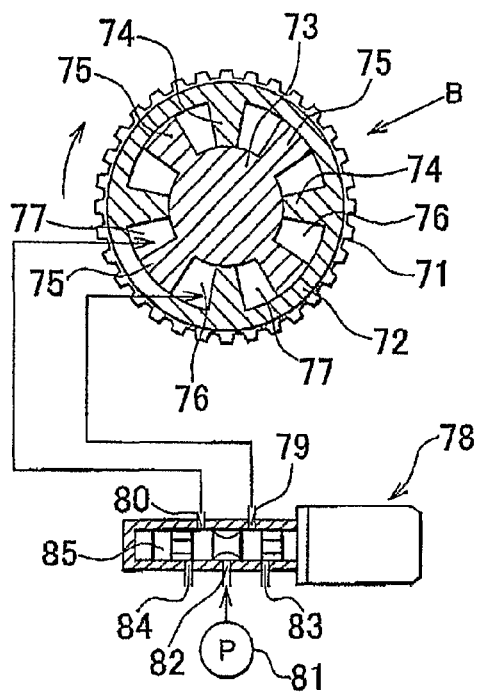
FIG. 4 shows a variable valve timing mechanism.

FIG. 4 shows the variable valve timing mechanism B that is attached to an end of a camshaft 70 for driving the intake valve 7 shown in FIG. 1. Referring to FIG. 4, the variable valve timing mechanism B includes: a timing pulley 71 that is rotated in the direction indicated by the arrow by the crankshaft of the engine through a timing belt; a cylindrical housing 72 that rotates with the timing pulley 71; a rotary shat 73 that rotates with the intake valve driving camshaft 70 and can relatively rotate with respect to the cylindrical housing 72; a plurality of separation walls 74 each extending from the inner circumferential surface of the cylindrical housing 72 to the outer circumferential surface of the rotary shat 73; and vanes 75, between the separation walls 74, each vane extending from the outer circumferential surface of the rotary shat 73 to the inner circumferential surface of the cylindrical housing 72. An advance hydraulic chamber 76 and a retard hydraulic chamber 77 are formed on respective sides of each vane 75.

The control of supply of hydraulic fluid to the hydraulic chambers 76 and 77 is performed by a hydraulic fluid supply control valve 78. The hydraulic fluid supply control valve 78 includes: hydraulic ports 79 and 80 that are connected to the hydraulic chambers 76 and 77, respectively; a supply port 82 for the hydraulic fluid discharged from a hydraulic pump 81; a pair of drain ports 83 and 84; and a spool valve 85 that controls connection and interruption between the ports 79, 80, 82, 83, and 84.

When the phase of the cam on the intake valve driving camshaft 70 should be advanced, the spool valve 85 is moved rightward in FIG. 4, so that the hydraulic fluid supplied through the supply port 82 is supplied to the advance fluid chamber 76 through the hydraulic port 79, and the hydraulic fluid in the retard hydraulic chamber 77 is discharged through the drain port 84. In this case, the rotary shaft 73 is relatively rotated with respect to the cylindrical housing 72 in the direction indicated by the arrow.

On the other hand, when the phase of the cam on the intake valve driving camshaft 70 should be retarded, the spool valve 85 is moved leftward in FIG. 4, so that the hydraulic fluid supplied through the supply port 82 is supplied to the retard fluid chamber 77 through the hydraulic port 80, and the hydraulic fluid in the advance hydraulic chamber 76 is discharged through the drain port 83. In this case, the rotary shaft 73 is relatively rotated with respect to the cylindrical housing 72 in the direction opposite to the direction indicated by the arrow.

When the spool valve 85 is returned to the neutral position shown in FIG. 4 while the rotary shaft 73 is being relatively rotated with respect to the cylindrical housing 72, the relative rotation of the rotary shaft 73 is stopped and the relative rotational position of the rotary shaft 73 is maintained as it is. Thus, it is possible to advance and retard the phase of the cam on the intake valve driving camshaft 70 by a desired amount using the variable valve timing mechanism B.

Figure 5:
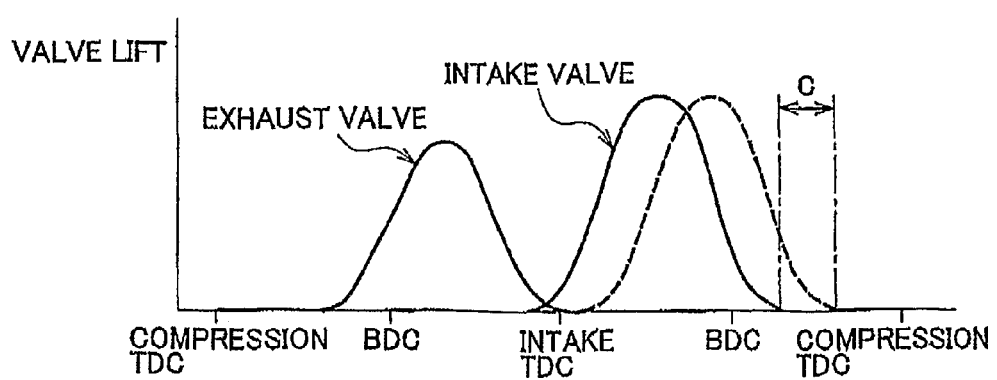
FIG. 5 is a diagram showing the lift amount of an intake valve and an exhaust valve.

In FIG. 5, the solid line shows the case where the phase of the cam on the intake valve driving camshaft 70 is maximally advanced by the variable valve timing mechanism B, and the broken line shows the case where the phase of the cam on the intake valve driving camshaft 70 is maximally retarded. Thus, it is possible to selectively set the period, during which the intake valve 7 is opened, within the range between the limit given by the solid line and the limit given by the broken line in FIG. 5, and it is also possible to set the valve closing timing of the intake valve 7 to a selected crank angle within the range shown by the arrow C in FIG. 5.

The variable valve timing mechanism B shown in FIGS. 1 to 4 is an example, and it is possible to use various types of variable valve timing mechanisms, such as a variable valve timing mechanism B that can change the valve closing timing of an intake valve with the valve opening timing, at which the intake valve is opened, kept unchanged, for example. In this embodiment of the invention, the variable valve timing mechanism B is used in order to change the timing at which actual compression starts. Thus, instead of the variable valve timing mechanism, any type of actual compression start timing-changing mechanism can be used as long as the actual compression start timing-changing mechanism can change the timing at which actual compression starts.

Figure 6A:
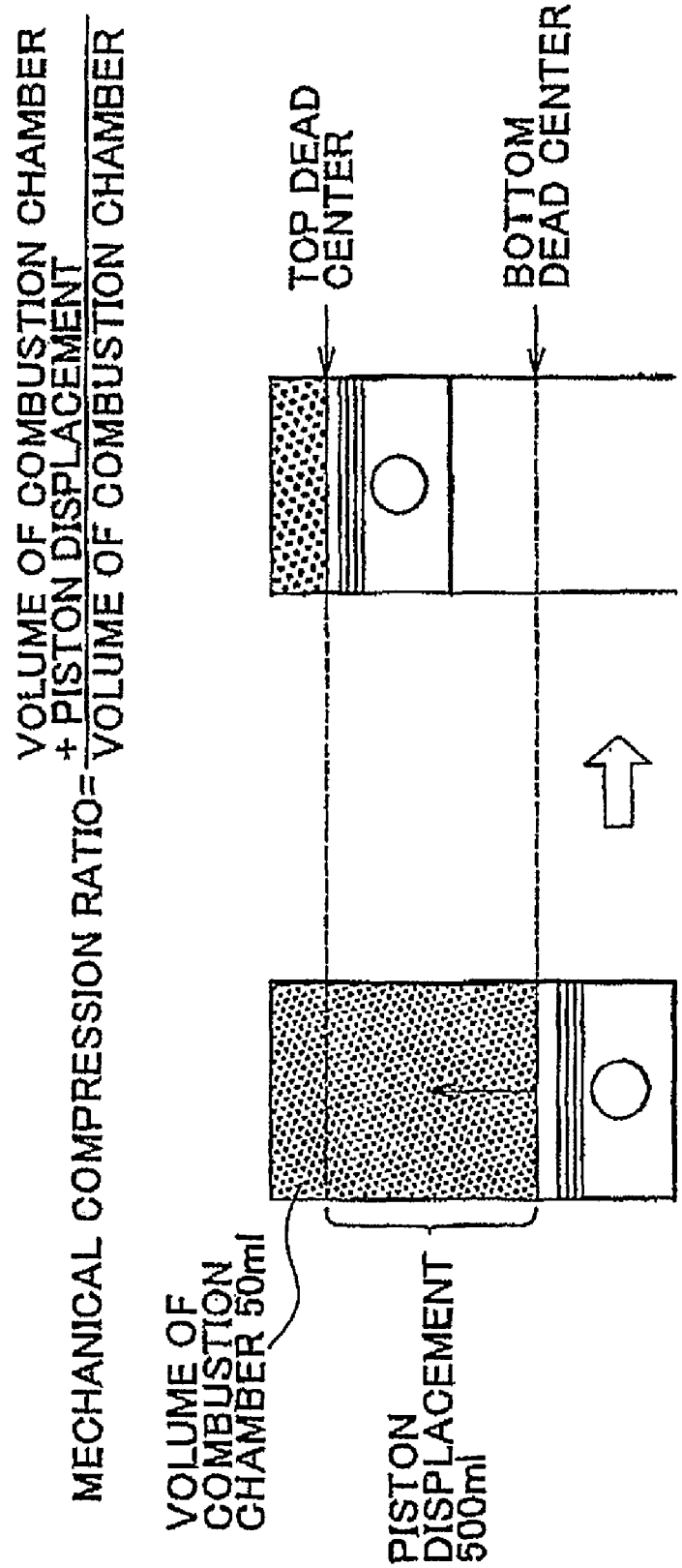
Figure 6C:
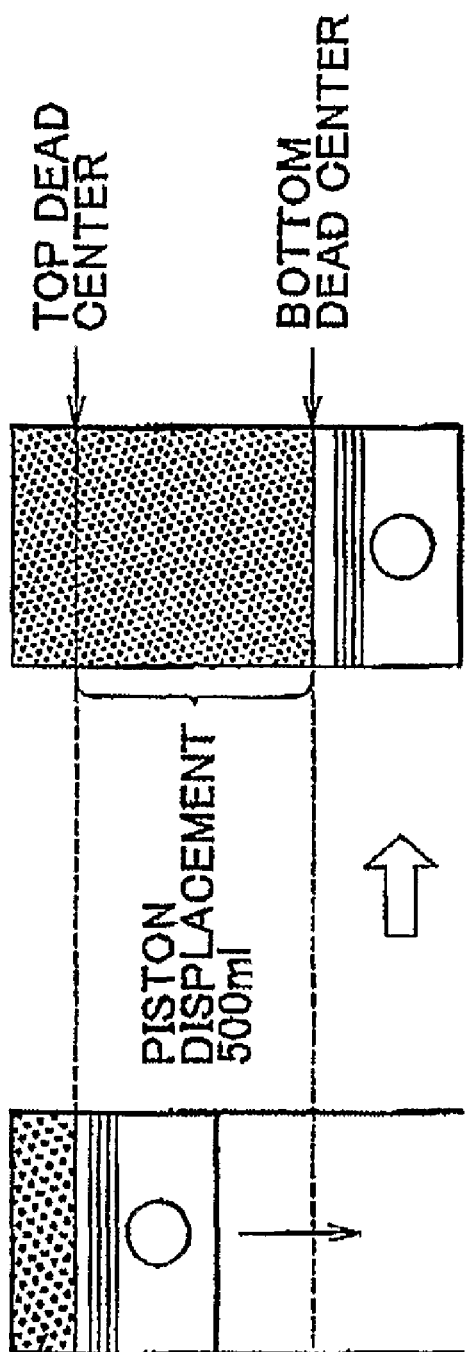

Next, referring to FIGS. 6A to 6C, meaning of the terms used in this specification will be described. In FIGS. 6A to 6C, for the purpose of description, an engine is shown in which the volume of a combustion chamber is 50 ml, and the piston displacement is 500 ml. The volume of the combustion chamber in FIGS. 6A to 6C means the volume of the combustion chamber that occurs when the piston is at the compression top dead center.

FIG. 6A illustrates the mechanical compression ratio. The mechanical compression ratio is a value automatically determined by the volume of the combustion chamber and the piston displacement during a compression stroke, and is expressed as (volume of combustion chamber+piston displacement)/(volume of combustion chamber). In the case of the example shown in FIG. 6A, the mechanical compression ratio is (50 ml+500 ml)/50 ml=11.

FIG. 6B describes the actual compression ratio. The actual compression ratio is a value determined by the volume of the combustion chamber and the actual piston displacement from when an actual compression starts to when the piston reaches the top dead center, and is expressed as (volume of combustion chamber+actual piston displacement)/(volume of combustion chamber). Specifically, as shown in FIG. 6B, even when the piston starts to ascend in a compression stroke, compression is not actually performed while the intake valve is open, and the actual compression is started when the intake valve is closed. Thus, the actual compression ratio is expressed as described above, using the actual piston displacement. In the case of the example shown in FIG. 6B, the actual compression ratio is (50 ml+450 ml)/50 ml=10.

FIG. 6C illustrates the expansion ratio. The expansion ratio is a value determined by the piston displacement during an expansion stroke and the volume of the combustion chamber, and is expressed as (volume of combustion chamber+piston displacement)/(volume of combustion chamber). In the case of the example shown in FIG. 6C, the expansion ratio is (50 ml+500 ml)/50 ml=11.

Figure 7:
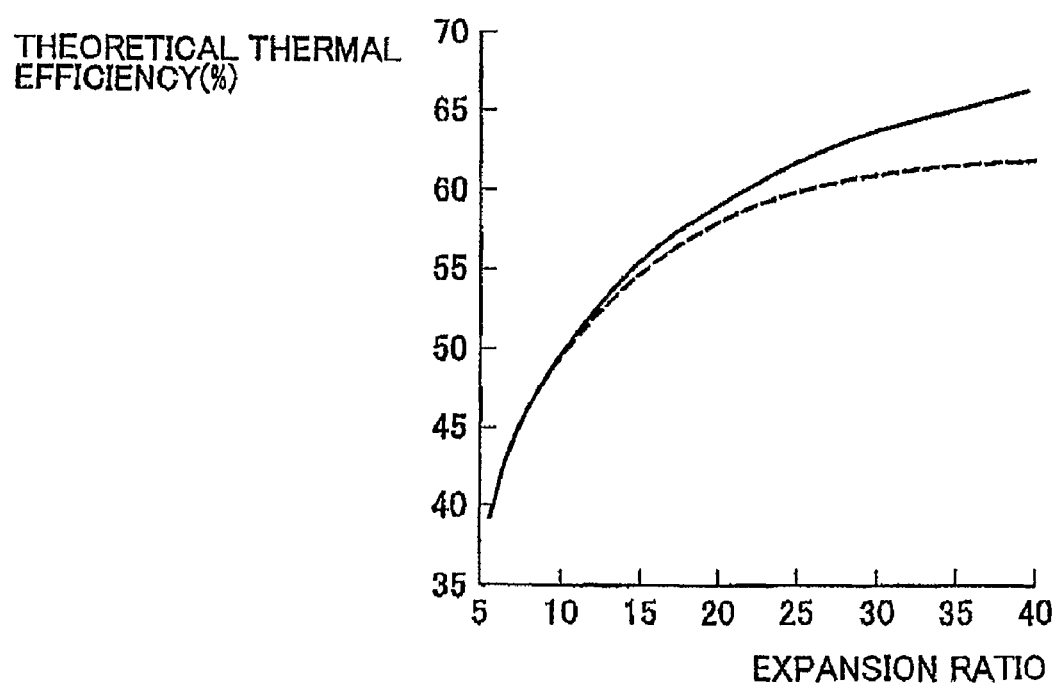
FIG. 7 shows the relation between theoretical thermal efficiency and expansion ratio.
Figure 8A:
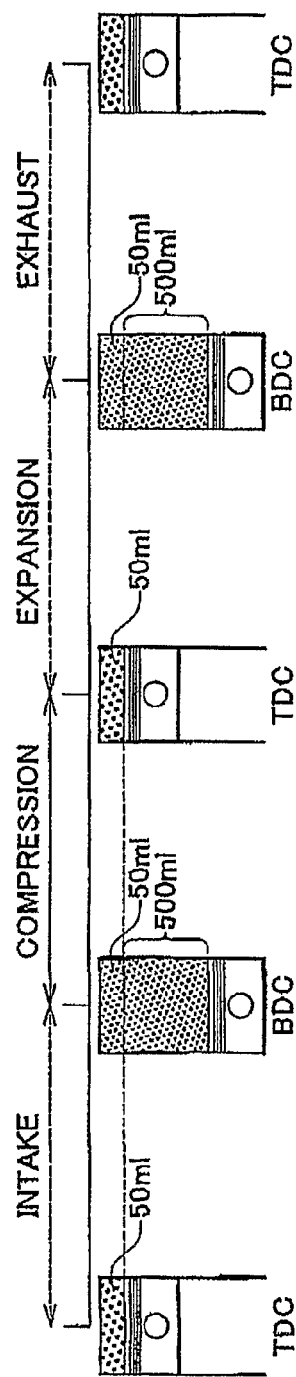
FIGS. 8A and 8B are diagrams for describing a normal cycle and a super high expansion ratio cycle.
Figure 8B:
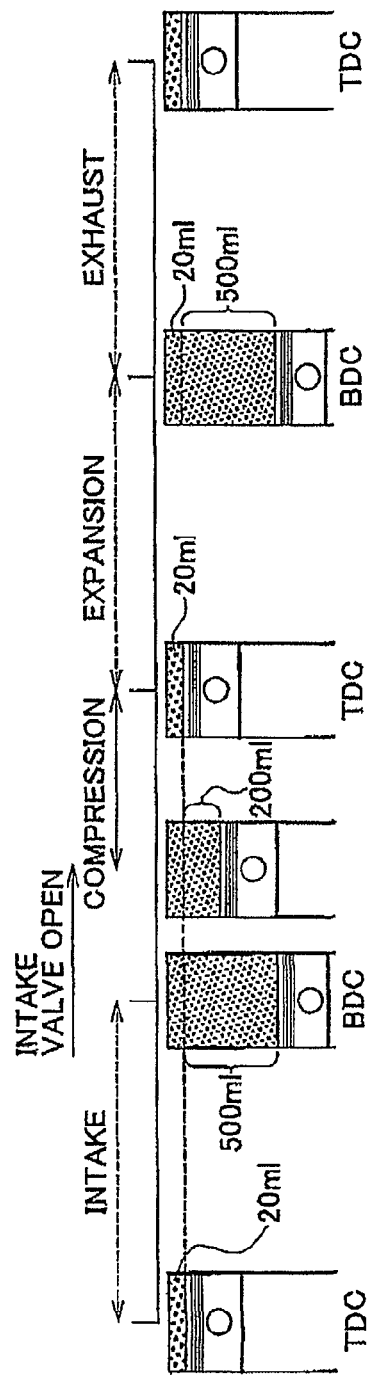

Next, referring to FIGS. 7, 8A and 8B, the fundamental features of the invention will be described. FIG. 7, shows the relation between theoretical thermal efficiency and expansion ratio. FIGS. 8A and 8B show the comparison between a normal cycle and a super high expansion ratio cycle, which are selectively used depending on the load in the invention.

FIG. 8A shows the normal cycle in which the intake valve is closed near the bottom dead center and the compression by the piston is started near the intake bottom dead center. Also in the example shown in FIG. 8A, the volume of the combustion chamber is 50 ml and the piston displacement is 500 ml as in the case of the example shown in FIGS. 6A to 6C. As can be seen from FIG. 8A, in the case of the normal cycle, the mechanical compression ratio is (50 ml+500 ml)/50 ml=11, the actual compression ratio is approximately 11, and the expansion ratio is (50 ml+500 ml)/50 ml=11. Thus, in the normal internal combustion engine, the mechanical compression ratio, the actual compression ratio, and the expansion ratio are substantially equal to each other.

In FIG. 7, the solid line shows how the theoretical thermal efficiency changes when the actual compression ratio and the expansion ratio are substantially equal to each other, that is, in the case of the normal cycle. In this case, it can be seen from FIG. 7 that as the expansion ratio increases, that is, the actual compression ratio increases, the theoretical thermal efficiency increases. Accordingly, in normal cycles, in order to increase the theoretical thermal efficiency, it suffices to increase the actual compression ratio. However, because of the restriction imposed by the occurrence of knocking during high engine load operation, the upper limit of the actual compression ratio is about 12, and therefore, the theoretical thermal efficiency cannot be sufficiently increased in normal cycles.

Under such circumstances, the present inventors studied the improvement of the theoretical thermal efficiency with the mechanical compression ratio and the actual compression ratio strictly distinguished. As a result, the present inventors have found that the expansion ratio is dominant in determining the theoretical thermal efficiency, and the actual compression ratio hardly affects the theoretical thermal efficiency. Specifically, when the actual compression ratio is increased, although the explosive power is increased, more energy is required to perform compression. For this reason, even when the actual compression ratio is increased, the theoretical thermal efficiency is hardly increased.

On the other hand, when the expansion ratio is increased, the period during which depression force is exerted on the piston during an expansion stroke is elongated, so that the period during which the piston applies a torque to the crankshaft is elongated. Thus, as the expansion ratio is increased, the theoretical thermal efficiency increases. The broken line in FIG. 7 shows how the theoretical thermal efficiency changes when the expansion ratio is increased with the actual compression ratio fixed at 10. As can be seen from FIG. 7, there is no significant difference between the amount of increase in the theoretical thermal efficiency when the expansion ratio is increased with the actual compression ratio maintained at a low value and the amount of increase in the theoretical thermal efficiency when both the actual compression ratio and the expansion ratio are increased as shown by the solid line in FIG. 7.

When the actual compression ratio is maintained at a low value, knocking does not occur. Thus, when the expansion ratio is increased with the actual compression ratio maintained at a low value, it is possible to significantly increase the theoretical thermal efficiency while preventing knocking from occurring. FIG. 8B shows an example in which the expansion ratio is increased while maintaining the actual compression ratio at a low value with the use of the variable compression ratio mechanism A and the variable valve timing mechanism B.

Referring to FIG. 8B, in this example, the volume of the combustion chamber is reduced from 50 ml to 20 ml by the variable compression ratio mechanism A. Meanwhile, the intake valve closing timing is retarded by the variable valve timing mechanism B so that the actual piston displacement is reduced from 500 ml to 200 ml. As a result, in this example, the actual compression ratio is (20 ml+200 ml)/20 ml=11, and the expansion ratio is (20 ml+500 ml)/20 ml=26. In the normal cycle shown in FIG. 8A, the actual compression ratio is approximately 11 and the expansion ratio is 11 as described above. In comparison with this case, it can be understood that only the expansion ratio is increased to 26 in the case shown in FIG. 8B. This is the reason why such a cycle is called a super high expansion ratio cycle.

In general, as described above, thermal efficiency is low when the load applied to the engine is low in the case of the internal combustion engine. Accordingly, in order to improve thermal efficiency, that is, improve fuel economy when a vehicle is running, it is necessary to improve the thermal efficiency during low engine load operation. However, in the case of the super high expansion ratio cycle shown in FIG. 8B, actual piston displacement during a compression stroke is small; and therefore the amount of intake air that can be taken into the combustion chamber 5 is small. Thus, the super high expansion ratio cycle cannot be employed except when the load applied to the engine is relatively low. Accordingly, in the invention, the super high expansion ratio cycle shown in FIG. 8B is used during low engine load operation, and the normal cycle shown in FIG. 8A is used during high engine load operation.

Figure 9:
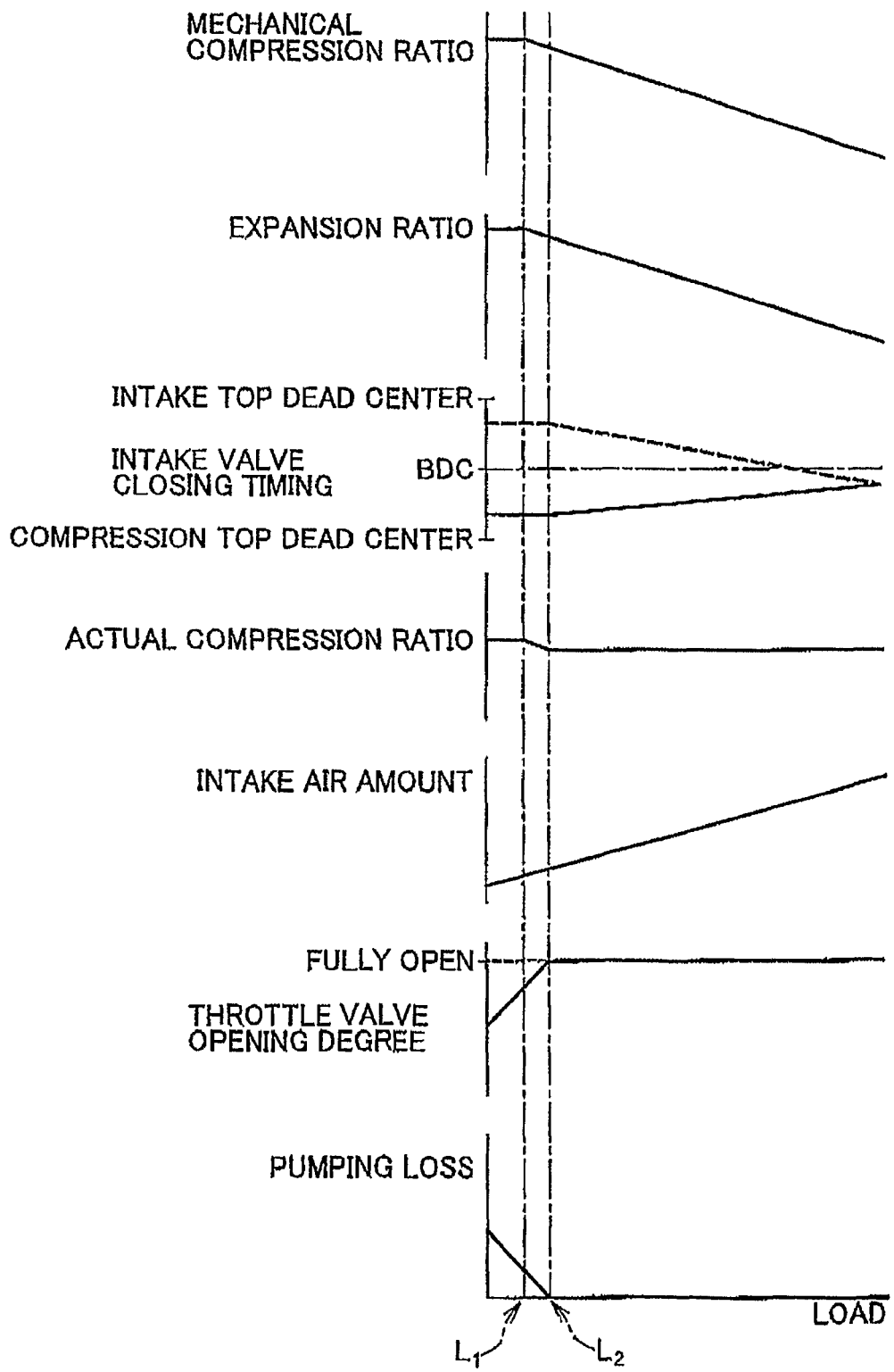
FIG. 9 is a diagram showing variations of a mechanical compression ratio etc. according to a load applied to the engine.

Next, referring to FIG. 9, an entire sequence of operation control will be described. FIG. 9 shows the variations, according to the load applied to the engine, of the mechanical compression ratio, the expansion ratio, the valve closing timing of the intake valve 7, the actual compression ratio, the intake air amount, the opening degree of the throttle valve 17, and the pumping loss. Note that in the embodiment of the invention, the average air-fuel ratio in the combustion chamber 5 is normally feedback-controlled to the stoichiometric air-fuel ratio based on the output signal from the air-fuel ratio sensor 21 so as to be able to simultaneously reduce the unburned HC, CO and NO in exhaust gas with the use of the three-way catalyst in the catalytic converter 20.

As described above, when the engine is operated at a high load, the normal cycle shown in FIG. 8A is performed. Thus, as shown in FIG. 9, in this case, the mechanical compression ratio is made low and the expansion ratio is therefore low, and in addition, as shown by the solid line in FIG. 9, the valve closing timing of the intake valve 7 is advanced as shown by the solid line in FIG. 5. In addition, in this case, the intake air amount is large, and the opening degree of the throttle valve 17 is kept fully open or substantially fully open, so that the pumping loss is zero.

On the other hand, when the engine load decreases as shown in FIG. 9, the mechanical compression ratio accordingly increases, and the expansion ratio also increases. In addition, in this case, as the load applied to the engine decreases as shown by the solid line in FIG. 9, the valve closing timing of the intake valve 7 is retarded so that the actual compression ratio is kept substantially unchanged. Note that also in this case, the throttle valve 17 is kept fully open or substantially fully open, and the amount of intake air that is supplied into the combustion chamber 5 is therefore controlled not by using the throttle valve 17 but by changing the valve closing timing of the intake valve 7. Also in this case, the pumping loss is zero.

When the engine is operated at a high load and the load applied to the engine then decreases, the mechanical compression ratio is increased as the amount of intake air is reduced with the actual compression ratio substantially unchanged. Specifically, the volume of the combustion chamber 5 when the piston 4 reaches the compression top dead center is reduced in proportion to the decrease in the intake air amount. Accordingly, the volume of the combustion chamber 5 when the piston 4 reaches the compression top dead center is changed in proportion to the decrease in the intake air amount. This means that the volume of the combustion chamber 5 when the piston 4 reaches the compression top dead center is changed in proportion to the amount of fuel because the air-fuel ratio in the combustion chamber 5 is the stoichiometric air-fuel ratio.

The mechanical compression ratio is further increased as the engine load further decreases. When the mechanical compression ratio reaches a predetermined maximum mechanical compression ratio, the mechanical compression ratio is maintained at the maximum mechanical compression ratio in the region in which the load is less than the engine load $L_1$ at which the mechanical compression ratio reaches the maximum mechanical compression ratio. Thus, during low engine load operation, the mechanical compression ratio becomes maximum, and the expansion ratio also becomes maximum. In other words, in the embodiment of the invention, the mechanical compression ratio is maximized so as to be able to achieve the maximum expansion ratio during low engine load operation. In addition, the actual compression ratio is maintained substantially the same as the actual compression ratio for middle or high engine load operation. In the embodiment according to the invention, the maximum mechanical compression ratio is the limit mechanical compression ratio, which is the limit determined by the structure of the combustion chamber 5.

Meanwhile, as shown by the solid line in FIG. 9, the valve closing timing of the intake valve 7 is retarded to the limit valve closing timing as the engine load decreases, the limit valve closing timing giving the limit within which the amount of intake air that is supplied into the combustion chamber 5 can be controlled. Then, the valve closing timing of the intake valve 7 is maintained at the limit valve closing timing in the region in which the load is less than the engine load $L_2$ at which the valve closing timing of the intake valve 7 reaches the limit valve closing timing. When the valve closing timing of the intake valve 7 is maintained at the limit valve closing timing, the intake air amount cannot be controlled by changing the valve closing timing of the intake valve 7, and it is therefore necessary to control the intake air amount with the use of alternative means.

With regard to the embodiment shown in FIG. 9, in this case, that is, in the region in which the load is less than the engine load $L_2$ at which the valve closing timing of the intake valve 7 reaches the limit valve closing timing, the amount of intake air that is supplied into the combustion chamber 5 is controlled by the throttle valve 17. However, when the amount of intake air is controlled using the throttle valve 17, pumping loss increases as shown in FIG. 9.

Meanwhile, in the case of the super high expansion cycle shown in FIG. 8B, the expansion ratio is 26 as described above. Higher expansion ratio is desirable. When the expansion ratio is equal to or higher than 20, a fairly high theoretical thermal efficiency can be obtained. Thus, in the invention, the variable compression ratio mechanism A is configured so that the expansion ratio becomes equal to or greater than 20.

It is also possible to control the intake air amount without using the throttle valve 17 by advancing the valve closing timing of the intake valve 7 as the engine load decreases as shown by the broken line in FIG. 9. Thus, the case shown by the solid line and the case shown by the broken line in FIG. 9 are collectively described as follows. In the embodiment of the invention, the valve closing timing of the intake valve 7 is shifted away from the intake bottom dead center BDC within the range defined by the limit valve closing timing $L_2$ that gives the limit within which the amount of intake air that is supplied into the combustion chamber can be controlled.

Figure 10:
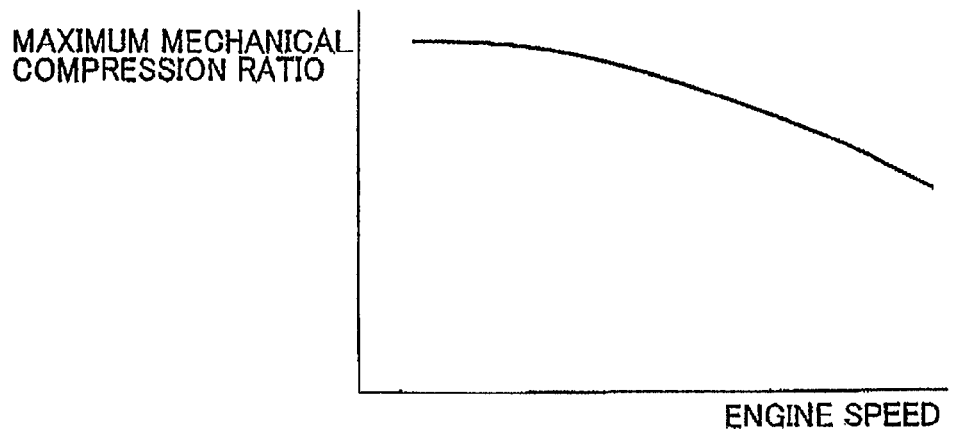
FIG. 10 shows the relation between maximum mechanical compression ratio and engine speed.

As shown in FIG. 9, in the embodiment of the invention, the mechanical compression ratio is brought to the maximum mechanical compression ratio during low engine load operation. During this, when the engine speed increases, there is a fear that the top surface of the piston 4 interferes with the inner surface of the cylinder head 3, the intake valve 7 or the exhaust valve 9 as described above. Thus, in the embodiment of the invention, as shown in FIG. 10, the maximum mechanical compression ratio while the engine is in operation is reduced with the increase in the engine speed.

The amount of elongation of the connecting rod that connects the piston 4 and the crankshaft, for example, exponentially increases as the engine speed increases. Thus, in the embodiment shown in FIG. 10, as the engine speed increases, the maximum mechanical compression ratio is reduced with the reduction rate gradually increasing.

Figure 11:
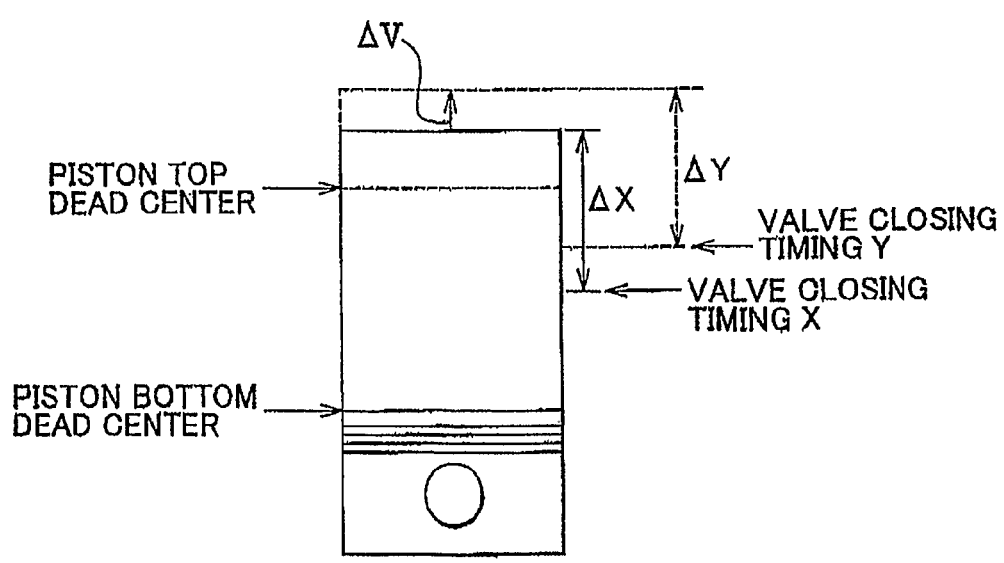
FIG. 11 is a diagram for describing the relation between the mechanical compression ratio and a valve closing timing of the intake valve 7.

Next, referring to FIG. 11, the relation between the variation in the mechanical compression ration and the variation in the valve closing timing of the intake valve 7 with the engine load kept the same. Note that a case where the valve closing timing of the intake valve 7 is controlled as shown by the solid line in FIG. 9 will be described below by way of example.

When the valve closing timing of the intake valve 7 is X in FIG. 11, the amount of intake air that is supplied into the combustion chamber is proportional to the volume of the space in the cylinder indicated by ΔX. Meanwhile, when the mechanical compression ratio is reduced and the volume of the combustion chamber is increased by ΔV, in order to keep the engine load the same, that is, in order to keep the amount of intake air that is supplied into the combustion chamber the same, it is necessary to bring the valve closing timing of the intake valve 7 to the valve closing timing indicated by Y so that the volume ΔY of the space in the cylinder after the intake valve 7 is closed is equal to the volume ΔX of the space in the cylinder. Specifically, when the mechanical compression ratio is reduced, the valve closing timing Y of the intake valve 7 has to be retarded with respect to the valve closing timing X.

Next, referring to FIG. 12, the relation between the mechanical compression ratio, the valve closing timing of the intake valve 7, and the opening degree of the throttle valve 17 will be described. Note that in FIG. 12, the solid lines represent the mechanical compression ratio, the valve closing timing of the intake valve 7, and the opening degree of the throttle valve 17, which are for low engine speed, in the low load region shown in FIG. 9.

Figure 12:
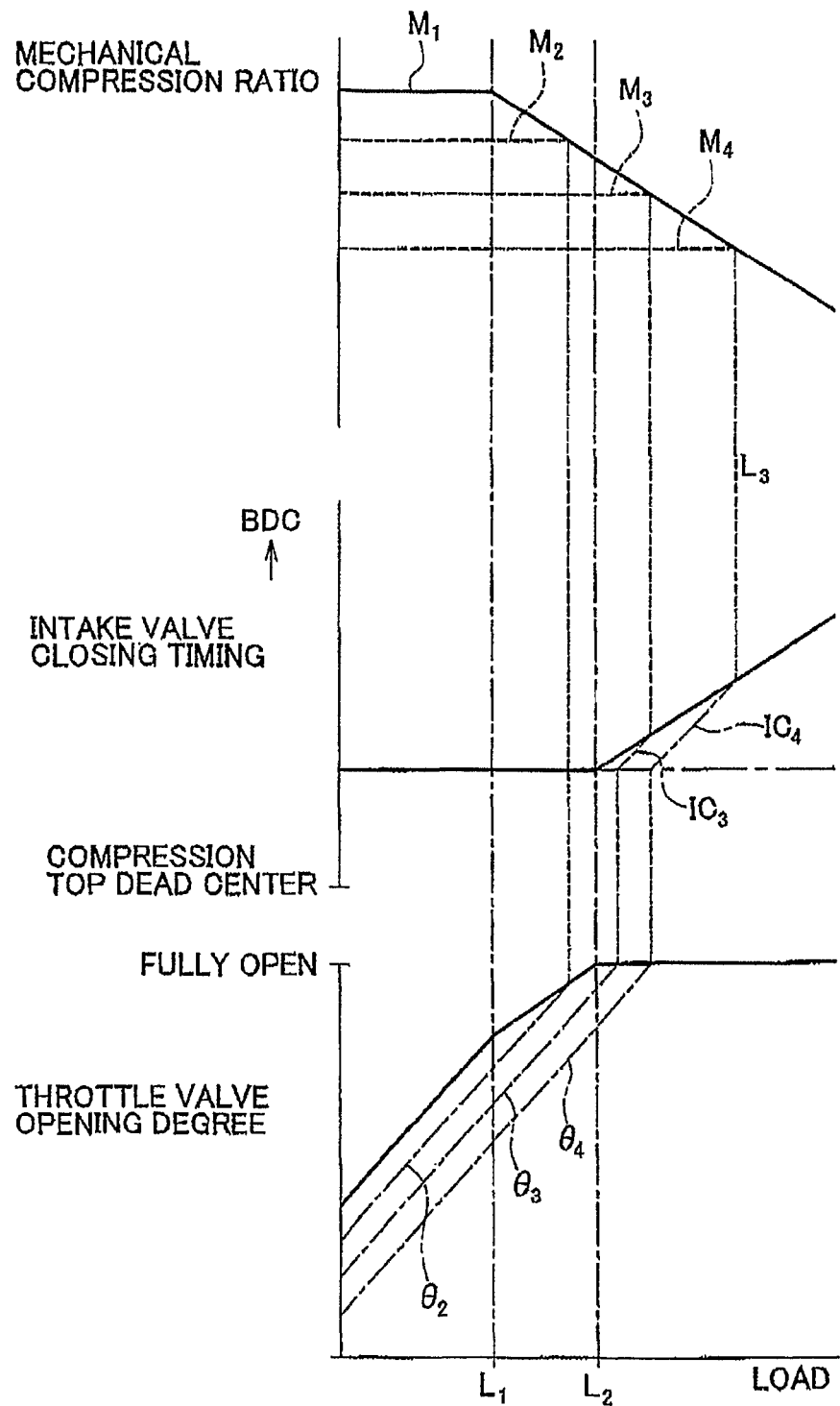
FIG. 12 shows the relation between the mechanical compression ratio, the valve closing timing of the intake valve 7, and the opening degree of a throttle valve.

According to the embodiment of the invention, the maximum mechanical compression ratio is reduced from M1, to M2, to M3, and to M4 as shown in FIG. 12 as the engine speed increases. In the case where the maximum mechanical compression ratio becomes $M_4$, for example, the mechanical compression ratio is kept at the maximum mechanical compression ratio $M_4$ after the engine load falls below $L_3$. In this case, the valve closing timing $IC_4$ of the intake valve 7 that makes the engine load the same as that for low engine speed, that is, makes the amount of intake air that is supplied into the combustion chamber the same as that for low engine speed, is later than the valve closing timing for low engine speed, which is represented by the solid line as described referring to FIG. 11.

Thus, in the embodiment of the invention, when the maximum mechanical compression ratio is reduced to $M_4$, and the mechanical compression ratio is maintained at the maximum mechanical compression ratio $M_4$, the valve closing timing $IC_4$ of the intake valve 7 is retarded with respect to the valve closing timing for low engine speed shown by the solid line. Similarly, when the maximum mechanical compression ratio is reduced to $M_3$, and the mechanical compression ratio is maintained at the maximum mechanical compression ratio $M_3$, the valve closing timing $IC_3$ of the intake valve 7 is retarded with respect to the valve closing timing during low engine speed shown by the solid line.

Meanwhile, when the engine load decreases, the valve closing timing $IC_3$ or $IC_4$ of the intake valve 7 thus reaches the limit valve closing timing, and when the amount of intake air that is supplied into the combustion chamber is still greater than the amount of intake air that corresponds to the present engine load, the throttle valve 17 is closed as shown by $\theta_3$ and $\theta_4$. In other words, in this case, the opening degree of the throttle valve 17 is reduced as the engine load is reduced.

In FIG. 12, when the mechanical compression ratio is the maximum mechanical compression ratio $M_2$, the valve closing timing of the intake valve 7 is the limit valve closing timing, and during this, the opening degree of the throttle valve 17 is reduced as shown by $\theta_2$ as the engine load decreases.

Figure 13A:
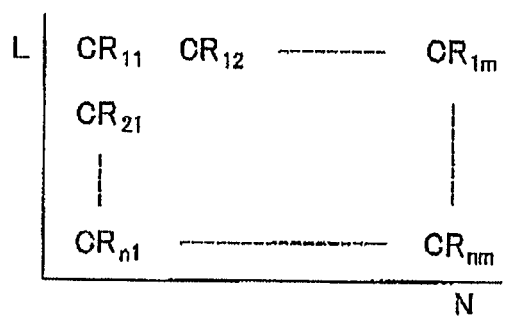
FIGS. 13A to 13C show maps of the mechanical compression ratio, the valve closing timing of the intake valve 7, and the opening degree of the throttle valve.
Figure 13B:
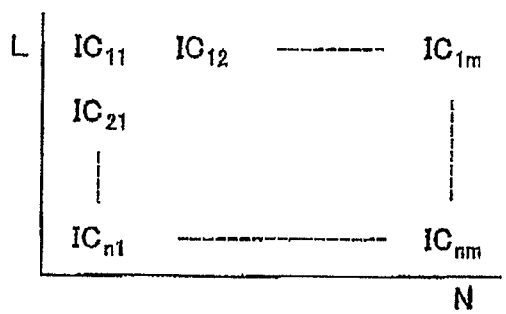
Figure 13C:
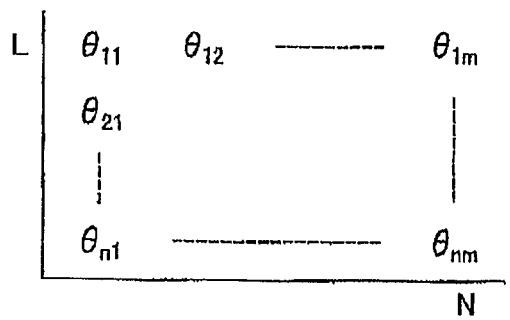

When the maximum mechanical compression ratio varies, not only the desired mechanical compression ratio corresponding to the engine load varies, but also the valve closing timing of the intake valve 7 and the opening degree of the throttle valve 17 vary as shown in FIG. 12. The desired mechanical compression ratio CR is previously stored in the ROM 32 as a function of engine load L and engine speed N in the form of a map as shown in FIG. 13. The valve closing timing IC of the intake valve 7 shown in FIG. 12 also is previously stored in the ROM 32 as a function of engine load L and engine speed N in the form of a map as shown in FIG. 13B. The opening degree θ of the throttle valve 17 shown in FIG. 12 also is previously stored in the ROM 32 as a function of engine load L and engine speed N in the form of a map as shown in FIG. 13C.

Figure 14:
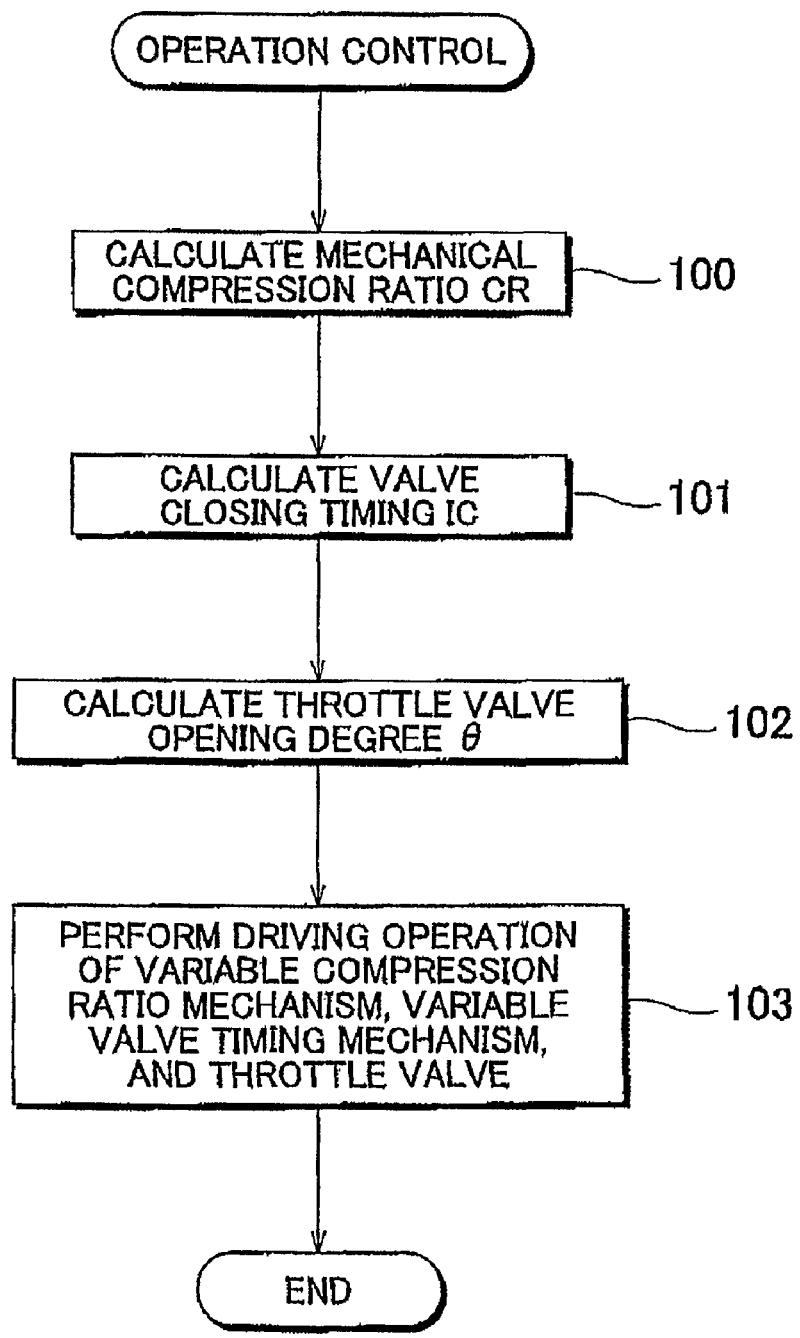
FIG. 14 is a flowchart for performing operation control.

FIG. 14 shows an operation control routine. Referring to FIG. 14, first, the mechanical compression ratio CR is calculated based on the map shown in FIG. 13A in step 100. Then, in step 101, a valve closing timing IC at which the intake valve 7 is closed is calculated based on the map shown in FIG. 13B. Then, in step 102, the opening degree θ of the throttle valve 17 is calculated based on the map shown in FIG. 13C. In step S103, the Variable compression ratio mechanism A is controlled so that the mechanical compression ratio is brought to the mechanical compression ratio CR, and the variable valve timing mechanism B is controlled so that the valve closing timing of the intake valve 7 is brought to the valve closing timing IC. In addition, the actuator 16 is controlled so that the opening degree of the throttle valve 17 is brought to the opening degree θ.

The invention claimed is:

1. A spark-ignited internal combustion engine comprising:
a variable compression ratio mechanism that changes a mechanical compression ratio, which is obtained by dividing a sum of the volume of a combustion chamber when a piston is at a compression top dead center and a piston displacement by the volume of the combustion chamber;
a throttle that regulates the amount of intake air that is supplied into the combustion chamber; and
an actual compression start timing-changing mechanism that changes a start timing at which an actual compression starts,
wherein a maximum mechanical compression ratio while the engine is in operation is reduced with increase in engine speed,
wherein the actual compression start timing-changing mechanism is a variable valve timing mechanism that controls a valve closing timing of the intake valve,
wherein the amount of intake air that is supplied into the combustion chamber is controlled by changing the valve closing timing of the intake valve,
wherein the valve closing timing of the intake valve is shifted away from an intake bottom dead center when the maximum mechanical compression ratio is reduced, and
wherein when the maximum mechanical compression ratio is reduced, the valve closing timing of the intake valve is shifted away from the intake bottom dead center within a range defined by a limit valve closing timing that gives a limit within which the amount of intake air that is supplied into the combustion chamber can be controlled, and when the amount of intake air that is supplied into the combustion chamber is still greater than the amount of intake air that corresponds to an engine load, the throttle valve is driven in a valve-closing direction.

2. The spark-ignited internal combustion engine according to claim 1, wherein the mechanical compression ratio is maximized so as to achieve a maximum expansion ratio while the engine is being operated at a load lower than a predetermined value.

3. The spark-ignited internal combustion engine according to claim 2, wherein the maximum expansion ratio is equal to or greater than 20.

4. The spark-ignited internal combustion engine according to claim 1, wherein the mechanical compression ratio is increased to the maximum mechanical compression ratio as a load applied to the engine decreases.

5. The spark-ignited internal combustion engine according to claim 4, wherein in a region in which the engine load is lower than the engine load at which the mechanical compression ratio reaches the maximum mechanical compression ratio, the mechanical compression ratio is maintained at the maximum mechanical compression ratio.

6. The spark-ignited internal combustion engine according to claim 1, wherein the throttle valve is normally kept fully open.

7. A method of controlling a spark-ignited internal combustion engine, which includes a variable compression ratio mechanism that changes a mechanical compression ratio, which is obtained by dividing a sum of the volume of a combustion chamber when a piston is at a compression top dead center and a piston displacement by the volume of the combustion chamber when the piston is at the compression top dead center, and an actual compression ratio start timing-changing mechanism that changes a start timing at which actual compression starts, the method comprising:
reducing a maximum mechanical compression ratio while the engine is in operation with increase in engine speed,
wherein the actual compression start timing-changing mechanism is a variable valve timing mechanism that controls a valve closing timing of the intake valve,
wherein an amount of intake air that is supplied into the combustion chamber is controlled by changing the valve closing timing of the intake valve,
wherein the valve closing timing of the intake valve is shifted away from an intake bottom dead center when the maximum mechanical compression ratio is reduced, and
wherein, when the maximum mechanical compression ratio is reduced, the valve closing timing of the intake valve is shifted away from the intake bottom dead center within a range defined by a limit valve closing the timing that gives a limit within which the amount of intake air that is supplied into the combustion chamber can be controlled, and when the amount of intake air that is supplied into the combustion chamber is still greater than the amount of intake air that corresponds to an engine load, the throttle valve is driven in a valve-closing direction.

8. The method according to claim 7, wherein the mechanical compression ratio is maximized so as to achieve a maximum expansion ratio while the engine is being operated at a load lower than a predetermined value.

9. The method according to claim 8, wherein the maximum expansion ratio is equal to or greater than 20.

10. The method according to claim 7, wherein the mechanical compression ratio is increased to the maximum mechanical compression ratio as a load applied to the engine decreases.

11. The method according to claim 10, wherein in a region in which the engine load is lower than the engine load at which the mechanical compression ratio reaches the maximum mechanical compression ratio, the mechanical compression ratio is maintained at the maximum mechanical compression ratio.

12. The method according to claim 7, wherein the throttle valve is normally kept fully open.

\* \* \* \* \*